(12) United States Patent
Lin et al.

(10) Patent No.: US 7,234,368 B1
(45) Date of Patent: Jun. 26, 2007

(54) BALL SCREW DEVICE HAVING LUBRICATING STRUCTURE

(75) Inventors: Chung Hsueh Lin, Taichung (TW); Yan Yu Chen, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 0 days.

(21) Appl. No.: 11/274,568

(22) Filed: Nov. 15, 2005

(51) Int. Cl.
*F16H 3/06* (2006.01)
*F16H 27/02* (2006.01)
*F16H 29/02* (2006.01)
*F16H 29/20* (2006.01)

(52) U.S. Cl. ............... 74/89.44; 74/424.83; 74/424.87
(58) Field of Classification Search ............... 74/89.44, 74/89.43, 424.83, 424.87
See application file for complete search history.

(56) References Cited

U.S. PATENT DOCUMENTS

| | | | |
|---|---|---|---|
| 2,979,071 A * | 4/1961 | Herring et al. | 137/246.13 |
| 3,661,030 A * | 5/1972 | Gagne | 74/424.83 |
| 5,014,568 A * | 5/1991 | Schlenker | 74/424.86 |
| 5,168,767 A * | 12/1992 | Morita | 74/89.44 |
| 6,023,991 A * | 2/2000 | Yabe et al. | 74/89.44 |
| 6,216,821 B1 * | 4/2001 | Namimatsu et al. | 184/99 |
| 6,247,556 B1 * | 6/2001 | Chen | 184/83 |
| 6,451,744 B1 | 9/2002 | Chang | 508/106 |
| 2005/0252324 A1 * | 11/2005 | Kato et al. | 74/89.44 |

* cited by examiner

*Primary Examiner*—Richard Ridley
*Assistant Examiner*—James Pilkington
(74) *Attorney, Agent, or Firm*—Charles E. Baxley

(57) ABSTRACT

A ball screw device includes a ball nut having an inner thread formed by a number of helical groove portions, a screw shaft having an outer thread formed by a number of helical groove portions, for threading with the inner thread of the ball nut, and a number of rolling members engaged in the helical groove portions of the ball nut and the screw shaft, for facilitating a movement of the ball nut relative to the screw shaft. One or more guide members are engaged in the helical groove portions of the screw shaft, and each has an oil retaining member for suitably absorbing oil and for continuously applying the oil onto the screw shaft. A tube may couple two of the helical groove portions of the ball nut together, to form an endless ball rolling passage and to receive the rolling members.

5 Claims, 7 Drawing Sheets

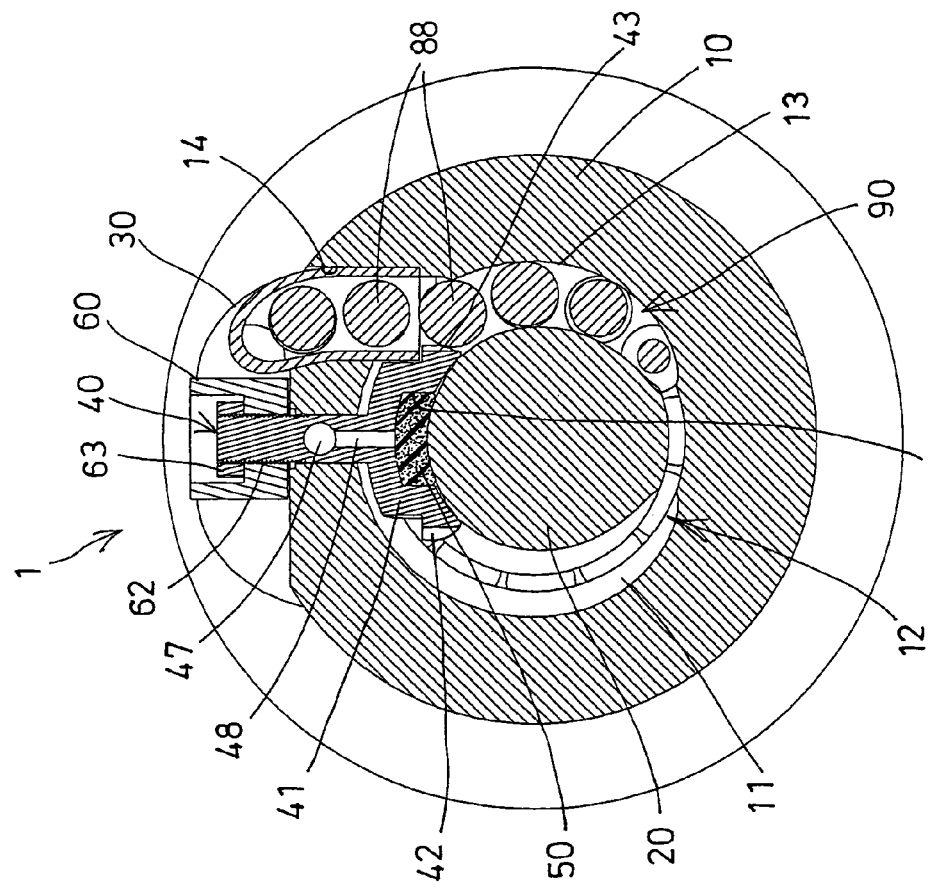
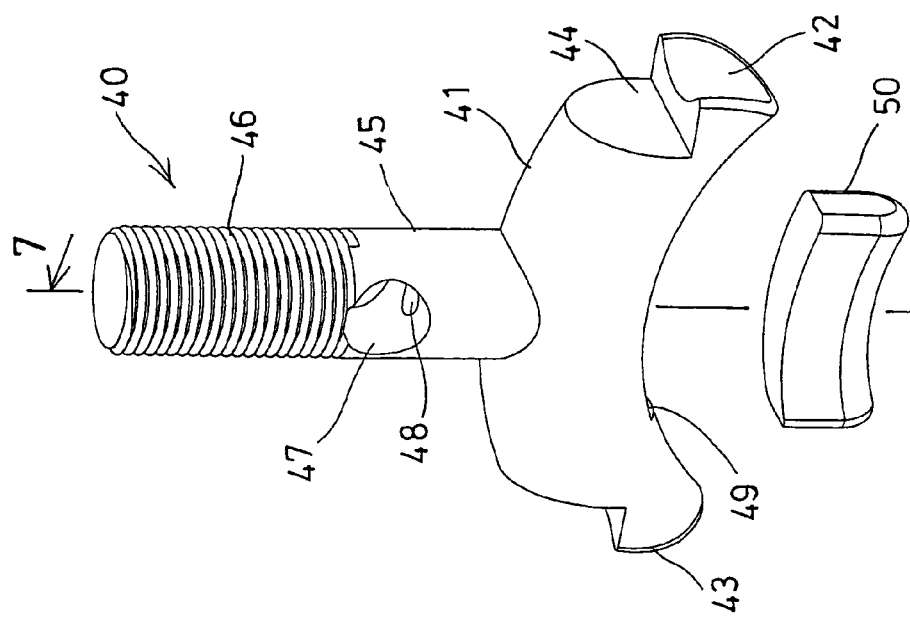

BALL SCREW DEVICE HAVING LUBRICATING STRUCTURE

BACKGROUND OF THE INVENTION

1. Field of the Invention

The present invention relates to a ball screw device, and more particularly to a ball screw device having a lubricating structure for effectively applying or supplying grease or oil to lubricate the ball screw device.

2. Description of the Prior Art

Typical ball screw devices comprise a ball nut rotatably and/or moveably engaged onto a screw shaft, and a number of balls or rollers or rolling members disposed or engaged between the ball nut and the screw shaft, for allowing the ball nut to be smoothly rotated and/or moved relative to the screw shaft.

Normally, the ball nut may be rotated and/or moved in a great speed relative to the screw shaft, such that grease or oil is required to be applied or supplied into the rolling members and the space defined between the ball nut and the screw shaft, for lubricating the ball screw device.

However, a precise sealing structure should be formed and provided between the ball nut and the ball screw, for preventing the grease or oil from flowing out of the ball nut and the screw shaft, such that a complicated and an accurate structure should be arranged between the ball nut and the screw shaft, to suitably retain the balls or rollers or rolling members and the grease or oil between the ball nut and the screw shaft.

U.S. Pat. No. 6,451,744 to Chang discloses one of the typical bushing assemblies including an inbuilt lubricating member provided therein and engaged between the ball nut and the screw shaft, for lubricating the ball nut and the screw shaft. However, the inbuilt lubricating member may have a good chance to be worn out after use, such the lubrication between the ball nut and the screw shaft may be become failure.

The present invention has arisen to mitigate and/or obviate the afore-described disadvantages of the conventional ball screw devices for such as machine tools or the like.

SUMMARY OF THE INVENTION

The primary objective of the present invention is to provide a ball screw device including a lubricating structure for effectively applying or supplying grease or oil to suitably lubricate the ball screw device.

In accordance with one aspect of the invention, there is provided a ball screw device comprising a ball nut including a bore formed therein and having an inner thread formed therein and defined by a plurality of helical groove portions, a screw shaft rotatably engaged into the bore of the ball nut, and including an outer thread formed thereon and defined by a plurality of helical groove portions, for threading with the inner thread of the ball nut, and for allowing the ball nut to be moved relative to the screw shaft, a plurality of rolling members engaged in the helical groove portions of the ball nut and the screw shaft, for facilitating a movement of the ball nut relative to the screw shaft, at least one guide member engaged in the helical groove portion of the screw shaft, and an oil retaining member engaged in the guide member, for absorbing oil and for applying the oil onto the screw shaft.

The guide member includes a cavity formed therein for receiving the oil retaining member therein, the oil retaining member is engaged with the helical groove portion of the screw shaft. The ball nut includes a passage formed therein for coupling to an oil reservoir, and the guide member includes an aperture formed therein and aligned with the passage of the ball nut, for receiving the oil from the passage of the ball nut.

The guide member includes a passageway formed therein and communicating with the aperture and the cavity thereof, for allowing the oil from the passage of the ball nut to flow into the cavity of the guide member. The guide member includes a bar having the cavity formed therein, and a shank extended from the bar and engaged through the ball nut and having the aperture formed therein.

The shank includes an outer thread formed thereon and extended out of the ball nut and secured to an anchor with a lock nut. The bar includes two ends each having a curved recess formed therein, for deflecting the rolling member.

The ball nut includes two openings formed therein, and a tube engaged into the openings of the ball nut and coupling two of the helical groove portions of the screw shaft and the ball nut together, to form an endless ball rolling passage therein, and for receiving the rolling members. The guide member includes a bar having a curved structure for engaging in the helical groove portion of the screw shaft, and having a shoulder formed therein, for engaging with and for positioning the tube.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 4 is a cross sectional view of the ball screw device, taken along lines 4—4 of FIG. 2;

FIG. 5 is a partial exploded view illustrating an inner guide member of the ball screw device;

DETAILED DESCRIPTION OF THE PREFERRED EMBODIMENT

Figure 1:
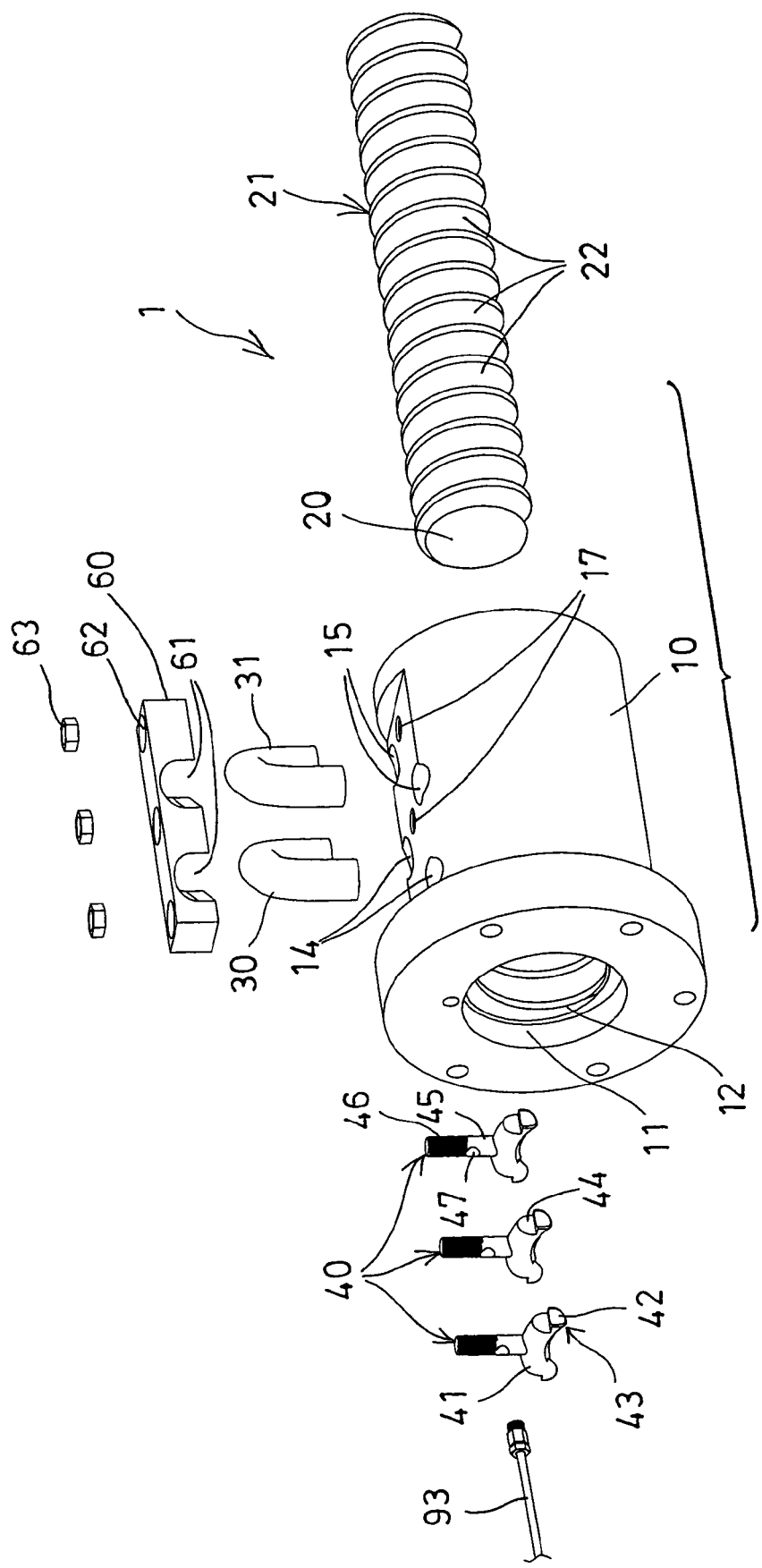
FIG. 1 is a partial exploded view of a ball screw device in accordance with the present invention.
Figure 2:
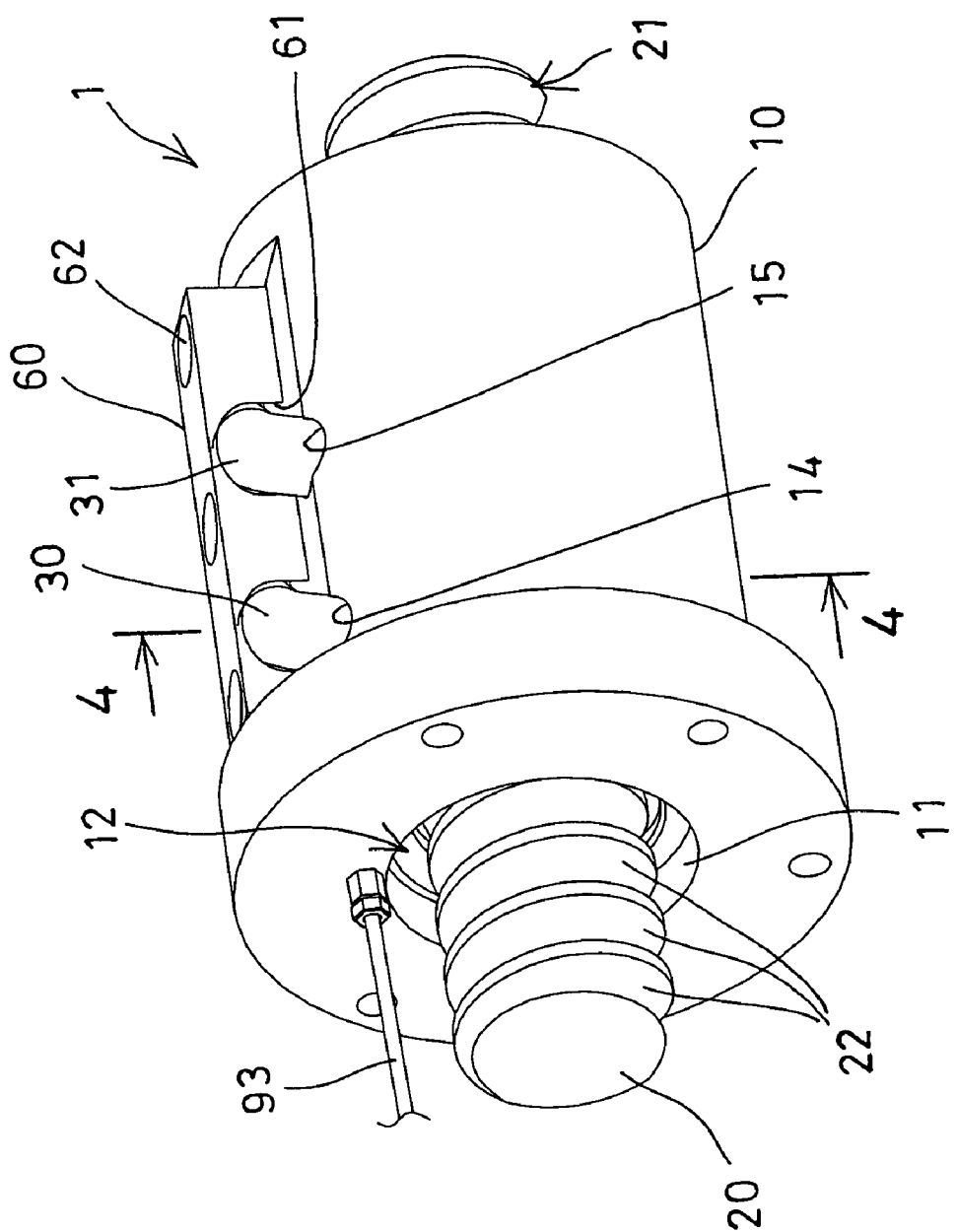
FIG. 2 is a partial perspective view of the ball screw device.
Figure 3:
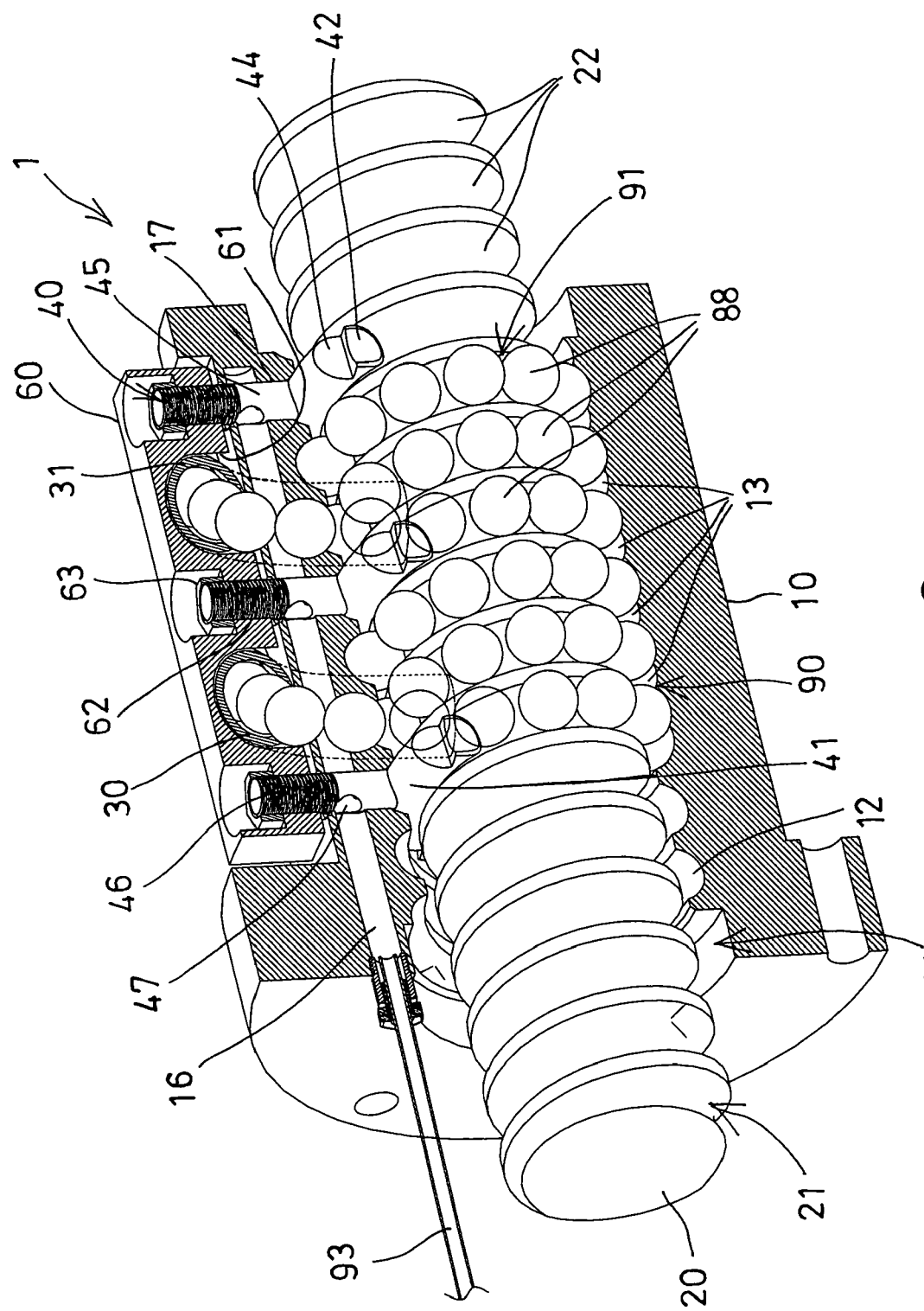
FIG. 3 is a partial perspective view of the ball screw device, similar to FIG. 2, in which one half of the ball screw device has been cut off for showing an inner structure of the ball screw device.
Figure 6:
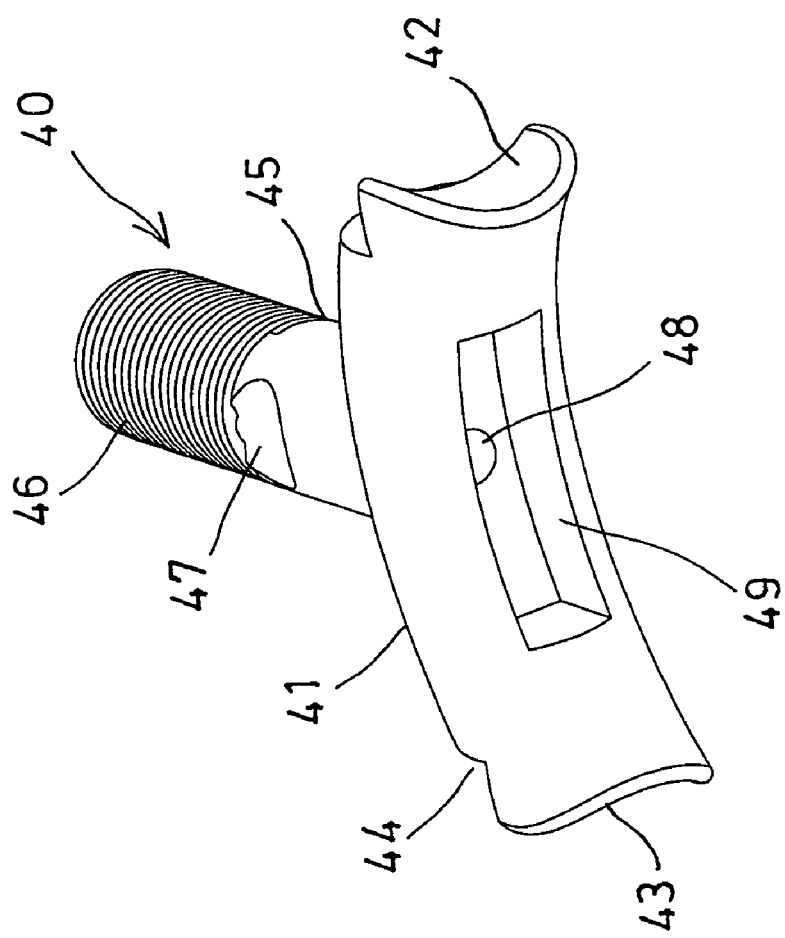
FIG. 6 is a bottom perspective view of the inner guide member of the ball screw device.
Figure 7:
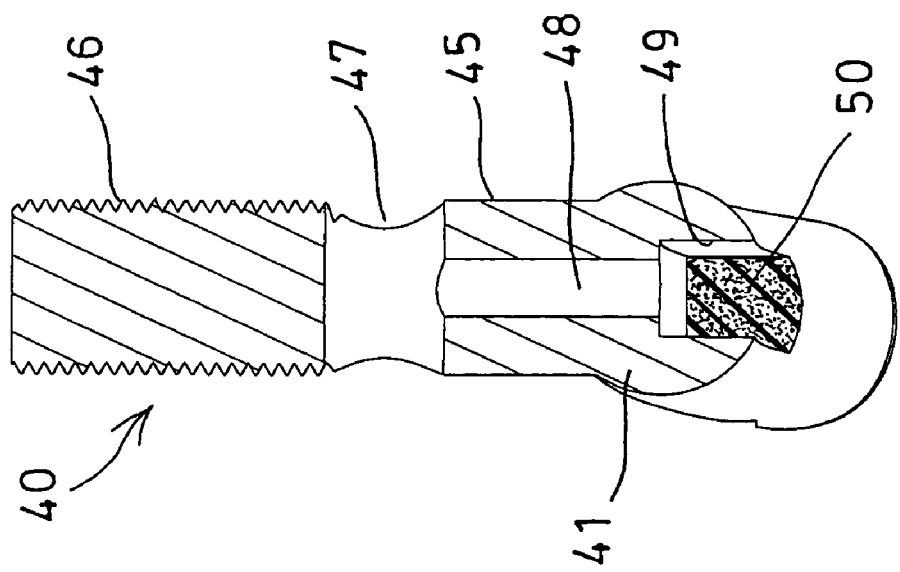
FIG. 7 is a partial cross sectional view of the ball screw device, taken along lines 7—7 of FIG. 5.

Referring to the drawings, and initially to FIGS. 1–4, a ball screw device 1 in accordance with the present invention comprises an outer ball nut 10 including a bore 11 formed therein and having a helical groove or inner thread 12 formed therein and defined by a number of peripheral and helical groove portions 13 (FIGS. 3, 4), for threading with an outer thread 21 of a screw shaft 20, and thus for allowing the ball nut 10 to be moved along the screw shaft 20, or for allowing the screw shaft 20 to be rotated and moved relative to the ball nut 10 when the screw shaft 20 is rotated relative to the ball nut 10.

The screw shaft 20 also includes a number of peripheral and helical groove portions 22 formed therein for forming or defining the outer thread 21 thereof, and for rotatably and/or movably receiving balls or rollers or rolling members 88 therein which may facilitate the rotating movement of the ball nut 10 relative to the screw shaft 20 when the screw shaft 20 is rotated relative to the ball nut 10, in order to constitute the primary structure of the ball screw device 1.

The ball nut 10 includes one or more, such as two pairs of openings 14, 15 formed therein, and one or more, such as two conduits or tubes 30, 31 are engaged into the pairs of openings 14, 15 of the ball nut 10 respectively, for coupling two or more of the peripheral and helical groove portions 22, 13 of the screw shaft 20 and the ball nut 10 together, to form one or more endless ball rolling passages 90, 91 therein, and for allowing the balls or rollers or rolling members 88 to move along the endless ball rolling passages 90, 91 respectively.

The ball nut 10 further includes a lateral or longitudinal passage 16 formed therein (FIG. 3), and preferably parallel to the bore 11 thereof, and one or more orifices 17 formed therein and perpendicular to or intersecting with the passage 16 thereof and communicating with the respective peripheral and helical groove portions 22, 13 of the screw shaft 20 and the ball nut 10, and a hose 93 coupled to the passage 16 thereof, for coupling to a grease or oil reservoir, and for supplying the grease or oil into the endless ball rolling passages 90, 91 via the passage 16 and the orifices 17 of the ball nut 10 respectively.

One or more inner guide members 40 are further provided and each includes a bar 41 having a curved structure and engaged in the peripheral and helical groove portions 22 of the screw shaft 20 respectively, and having a curved recess 42 formed in each of two end portions 43 thereof (FIGS. 1, 3, 5, 6), for deflecting the balls or rollers or rolling members 88, and for guiding the balls or rollers or rolling members 88 to smoothly move along the endless ball rolling passages 90, 91 respectively.

The curved bar 41 of each of the inner guide members 40 further includes two notches or shoulders 44 formed in each of two end portions 43 thereof, for engaging with the ends of the conduits or tubes 30, 31, and for stably position the curved bar 41 and the tubes 30, 31 to the ball nut 10 and the screw shaft 20. The guide members 40 each includes a shank 45 extended from the bar 41, and engaged through the orifices 17 of the ball nut 10 respectively, and each having an outer thread 46 formed thereon, and an aperture 47 formed therein and aligned with the passage 16 of the ball nut 10, for receiving the grease or oil from the hose 93.

The guide members 40 each further includes a passageway 48 formed therein and formed through the bar 41 (FIGS. 4–7), and communicating with the aperture 47 thereof, for allowing the grease or oil from the passage 16 of the ball nut 10 and the hose 93 to flow into the endless ball rolling passages 90, 91 respectively, in order to lubricate the balls or rollers or rolling members 88 and the ball nut 10 and the screw shaft 20. The guide members 40 each further includes a cavity 49 formed therein, such as formed in the bar 41, and communicating with the passageway 48 thereof, for receiving an oil or grease receiving or retaining member 50 therein.

For example, the oil receiving or retaining member 50 may be engaged in the peripheral and helical groove portions 22 or 13 of the screw shaft 20 or the ball nut 10, and may be made of spongy materials, fiber or woven materials, hair felt, mops, or the like, for receiving and absorbing the grease or oil from the passage 16 of the ball nut 10 and the hose 93, and for gradually applying the grease or oil onto the screw shaft 20 and/or the ball nut 10, and thus for suitably lubricating the balls or rollers or rolling members 88 and the ball nut 10 and the screw shaft 20.

The oil receiving or retaining member 50 and/or the inner guide members 40 may thus be formed as a grease or oil supplying means for gradually and suitably and uniformly supplying the grease or oil onto the balls or rollers or rolling members 88 and the ball nut 10 and the screw shaft 20, and the grease or oil may be continuously supplied into the passage 16 of the ball nut 10 from the grease or oil reservoir via the hose 93.

Figure 8:
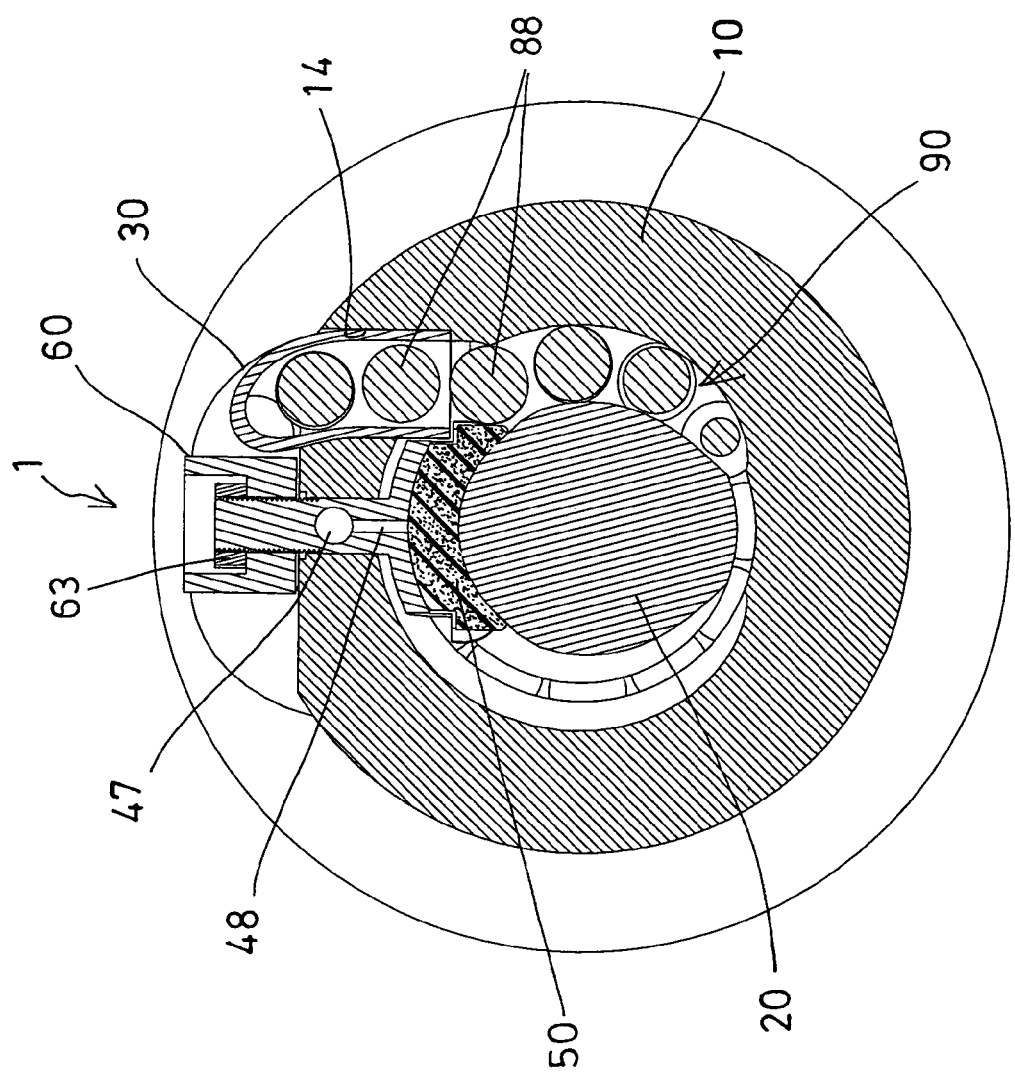
FIG. 8 is a cross sectional view similar to FIG. 4, illustrating the other arrangement of the ball screw device.
Figure 9:
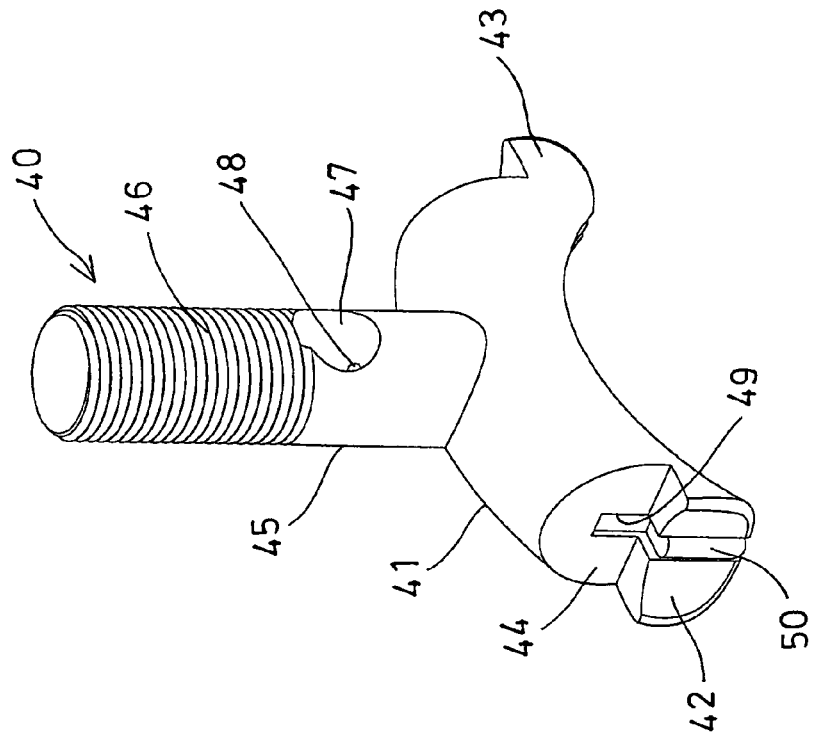
FIG. 9 is a perspective view illustrating the inner guide member of the ball screw device as shown in FIG. 8.
Figure 10:
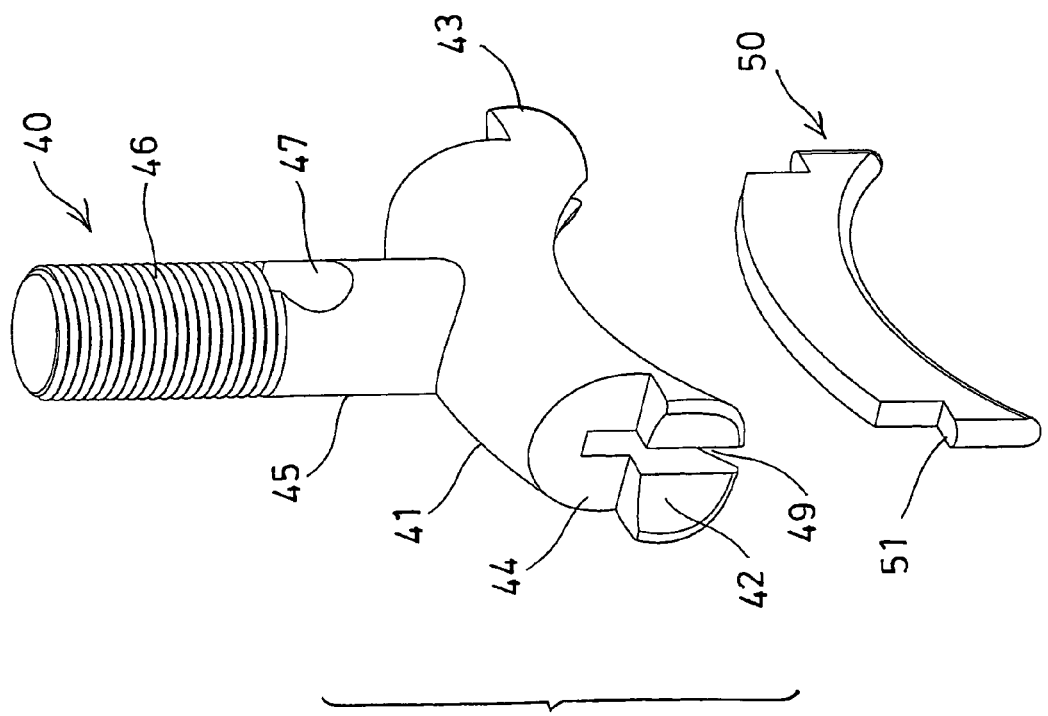
FIG. 10 is a partial exploded view illustrating the inner guide member of the ball screw device as shown in FIGS. 8 and 9.

Alternatively, as shown in FIGS. 8–10, the cavity 49 of each of the guide members 40 may be formed laterally through the bar 41, and the oil receiving or retaining member 50 may include a corresponding shape for being suitably received within the cavity 49 of the guide member 40, and may further include two notches or shoulders 51 formed in the end portions thereof, for aligning with the corresponding notches or shoulders 44 of the guide members 40, and for engaging with the ends of the conduits or tubes 30, 31.

Referring again to FIGS. 1–4, an anchor 60 may further be provided and attached onto the ball nut 10, and includes one or more depressions 61 formed in the bottom portion thereof, for partially receiving the tubes 30, 31 respectively, and for stably positioning the tubes 30, 31 to the ball nut 10, and includes one or more perforations 62 formed therein, and aligned with the orifices 17 of the ball nut 10 respectively, for receiving the shanks 45 of the guide members 40 respectively, which may be threaded with lock nuts 63, in order to solidly secure the guide members 40 to the ball nut 10.

Accordingly, the ball screw device in accordance with the present invention includes a lubricating structure for effectively applying or supplying grease or oil to lubricate the ball screw device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

The invention claimed is:

1. A ball screw device comprising:
a ball nut including a bore formed therein and having an inner thread formed therein and defined by a plurality of helical groove portions, and including an orifice formed therein and communicating with said helical groove portions of said ball nut, and said ball nut including a passage formed therein for receiving an oil,
a screw shaft rotatably engaged into said bore of said ball nut, and including an outer thread formed thereon and defined by a plurality of helical groove portions, for threading with said inner thread of said ball nut, and for allowing said ball nut to be moved relative to said screw shaft, a plurality of rolling members engaged in said helical groove portions of said ball nut and said screw shaft, for facilitating a movement of said ball nut relative to said screw shaft, at least one guide member including a bar having a curved structure and engaged in said helical groove portion of said screw shaft, and including a cavity formed in said bar, and including a shank extended from said bar and engaged through said orifice of ball nut, and including an aperture formed in said shank and aligned with said passage of said ball nut for receiving the oil from said passage of said ball nut, and including a passageway formed therein and communicating with said aperture of said shank and said cavity of said bar for allowing the oil to flow from said passage of said ball nut into said cavity of said at least one guide member, and an oil retaining member engaged in said cavity of said at least one guide member and engaged with said helical groove portion of said screw shaft, for absorbing oil and for applying the oil onto said screw shaft.

2. The ball screw device as claimed in claim 1, wherein said shank includes an outer thread formed thereon and extended out of said ball nut and secured to an anchor with a lock nut.

3. The ball screw device as claimed in claim 1, wherein said bar includes two ends each having a curved recess formed therein, for deflecting said rolling member.

4. The ball screw device as claimed in claim 1, wherein said ball nut includes two openings formed therein, and a tube engaged into said openings of said ball nut and coupling two of said helical groove portions of said screw shaft and said ball nut together, to form an endless ball rolling passage therein, and for receiving said rolling members.

5. The ball screw device as claimed in claim 4, wherein said bar of the at least one guide member includes a shoulder formed therein, for engaging with said tube.

* * * * *